US011803761B2

(12) United States Patent
Pete et al.

(10) Patent No.: US 11,803,761 B2
(45) Date of Patent: Oct. 31, 2023

(54) ANALYTIC INSIGHTS FOR HIERARCHIES

(71) Applicant: Business Objects Software Ltd., Dublin (IE)

(72) Inventors: Balazs Pete, Dublin (IE); Andong Wang, Vancouver (CA); Jung-Rung Han, Vancouver (CA); Flavia Silvana Moser, Vancouver (CA); Alan Maher, Roscommon (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 919 days.

(21) Appl. No.: 16/689,921

(22) Filed: Nov. 20, 2019

(65) Prior Publication Data

US 2021/0150375 A1     May 20, 2021

(51) Int. Cl.
*G06N 5/02* (2023.01)
*G06F 3/0481* (2022.01)
*G06N 5/04* (2023.01)
*G06N 5/00* (2023.01)

(52) U.S. Cl.
CPC .............. *G06N 5/02* (2013.01); *G06N 5/00* (2013.01); *G06N 5/04* (2013.01); *G06F 3/0481* (2013.01)

(58) Field of Classification Search
CPC ........... G06N 5/02; G06N 5/04; G06F 3/0481
See application file for complete search history.

(56) References Cited

U.S. PATENT DOCUMENTS

| 9,953,372 | B1* | 4/2018 | Dziabiak | G06Q 40/08 |
| 2008/0162209 | A1* | 7/2008 | Gu | G06Q 10/0637 |
| 2015/0067556 | A1* | 3/2015 | Tibrewal | G06F 3/04847 715/765 |
| 2015/0170171 | A1* | 6/2015 | McCurnin | G06N 5/04 705/7.31 |
| 2015/0254369 | A1* | 9/2015 | Hou | G06F 16/248 707/798 |
| 2016/0055232 | A1* | 2/2016 | Yang | G06F 16/2428 707/740 |
| 2016/0162165 | A1* | 6/2016 | Lingappa | G06F 40/106 715/771 |
| 2016/0188185 | A1* | 6/2016 | Bous | G06F 40/18 715/202 |
| 2017/0237799 | A1* | 8/2017 | Veeravalli | H04L 43/08 709/224 |
| 2018/0336710 | A1* | 11/2018 | Zhao | G06K 9/6232 |
| 2019/0324953 | A1* | 10/2019 | Hedberg | G06F 16/2246 |

* cited by examiner

*Primary Examiner* — Phenuel S Salomon
(74) *Attorney, Agent, or Firm* — Fountainhead Law Group P.C.

(57) ABSTRACT

The present disclosure pertains to processing a data model having hierarchical data. A front-end computer sends a request to a back-end computer for dimension candidates for the data model, which is visualized by the front-end computer. The front-end computer is configured score and rank such dimension candidates in order to determine statistics from the data model. The back-end computer determines dimension candidates based on their cardinality and hierarchical information and sends the dimension candidates to the front-end computer. The front-end computer performs the scoring and ranking of dimension candidates and determines statistics for a set of the dimension candidates. The statistics may be presented to a user along with charts and graphs representing the data model.

20 Claims, 10 Drawing Sheets

ANALYTIC INSIGHTS FOR HIERARCHIES

BACKGROUND

The present disclosure relates to computing and data processing and in particular to processing hierarchical data.

Some organizations may generate large and complex data sets (e.g., logs and records of events or items). Such organizations may utilize data analytics software to visualize and analyze such data, and make predictions and gather insights based on the data. However, the volume of analysis and insights provided by the data analytics software for large datasets may be overwhelming to users of the software. This may be problematic if the user cannot determine which information is the most important to decision making. The present disclosure addresses this issue and others, as further described below.

SUMMARY

The present disclosure provides a computer-implemented method for processing a data model. The method may be performed by a front-end computer. The method includes sending, to a back-end computer, a request for dimension candidates for the data model. The request includes a selected dimension identifier and a selected node identifier. The selected dimension identifier identifies a first dimension of a plurality of qualitative dimensions of a numerical measure. The selected node identifier identifies a selected node within the first dimension. The method also includes receiving, from the back-end computer, a response including a plurality of dimension candidates. Each dimension candidate of the plurality of dimension candidates includes a candidate node identifier and a level indicator. The candidate node identifier indicates a particular node in a particular dimension of the plurality of dimensions. The level indicator indicates a set of nodes on a particular level of the particular dimension with respect to the particular node. The method also includes determining statistics for each dimension candidate in a first subset of the plurality of dimension candidates. The statistics for each dimension candidate is based on an average of the numerical measure for the set of nodes indicated by candidate node identifier and the level indicator of the dimension candidate.

Another embodiment of the present disclosure provides computer-implemented method for processing a data model. The method may be performed by a back-end computer. The method includes receiving, from a front-end computer, a request for dimension candidates for the data model. The request includes a selected dimension identifier and a selected node identifier, the selected dimension identifier identifying a first dimension of a plurality of qualitative dimensions of a numerical measure. The selected node identifier identifying a selected node within the first dimension. The method also includes determining a plurality of dimension candidates based on the selected dimension identifier and the selected node identifier. The method also includes sending, to the front-end computer, a response including the plurality of dimension candidates. Each dimension candidate of the plurality of dimension candidates including a candidate node identifier and a level indicator. The candidate node identifier indicating a particular node in a particular dimension of the plurality of dimensions. The level indicator indicating a set of nodes on a particular level of the particular dimension with respect to the particular node.

Another embodiment of the present disclosure provides a non-transitory machine-readable medium storing a program executable by at least one processing unit of a device. The program comprising sets of instructions for sending, to a back-end computer, a request for dimension candidates for a data model. The request includes a selected dimension identifier and a selected node identifier. The selected dimension identifier identifies a first dimension of a plurality of qualitative dimensions of a numerical measure. The selected node identifier identifies a selected node within the first dimension. The program also comprises sets of instructions for receiving, from the back-end computer, a response including a plurality of dimension candidates. Each dimension candidate of the plurality of dimension candidates includes a candidate node identifier and a level indicator. The candidate node identifier indicates a particular node in a particular dimension of the plurality of dimensions. The level indicator indicates a set of nodes on a particular level of the particular dimension with respect to the particular node. The program also comprises sets of instructions for determining statistics for each dimension candidate in a first subset of the plurality of dimension candidates. The statistics for each dimension candidate is based on an average of the numerical measure for the set of nodes indicated by candidate node identifier and the level indicator of the dimension candidate.

The following detailed description and accompanying drawings provide a better understanding of the nature and advantages of the present disclosure.

DETAILED DESCRIPTION

Figure 1:
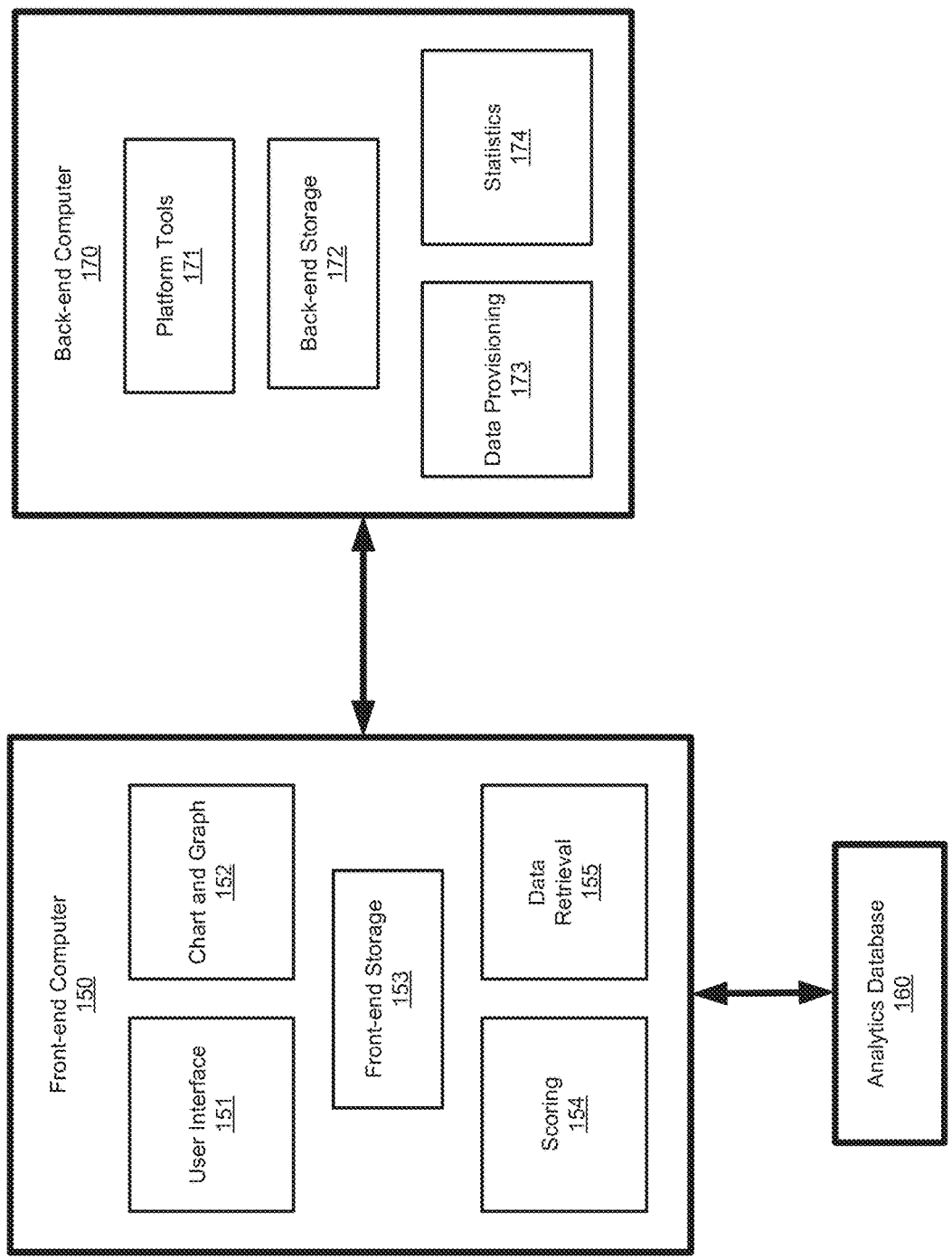
FIG. 1 shows a diagram of an analytics system including a front-end computer and a back-end computer, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As mentioned above, some organizations may generate large and complex data sets (e.g., logs and records of events or items) and they may utilize data analytics software to analyze the data, visualize the data, make predictions, and gather insights. However, the amount of analysis and insights provided by the data analytics software may be overwhelming to users of the software. This may be problematic if the user cannot determine which information is the most important to decision making.

Furthermore, in some cases the data set may be hierarchical such that portions of the data are subsets of other portions of the data. For instance, some the data may be categorical with certain categories having sub-categories. Hierarchies within the data set may add to the complexity of the analysis provided by data analytics software. This can be problematic because it may make it more challenging for users of the data analytics software to determine whether and how certain portions of the data affect data contribute to or influence other portions of the data.

The improved analytics software described herein reduces complexity of the analysis and make it easier for users of data analytics software to gather insights from the analysis. The improved analytics software enables users to better determine whether and how certain portions of the data affect data contribute to or influence other portions of the data. In addition, improved analytics software makes it easier for users to apply the analysis provided by the software to decision making.

As further described below, the improved analytics software may determine a limited number of the most influential "dimension candidates" within each dimension of a model of a dataset, which may be referred to as "top contributors." The analytics software may only present statistics on the top contributors to the user, as those statistics may correspond to the data that is likely to be the most interesting to the user. Reducing the amount of data presented and focusing on the most interesting data is advantageous because it is less likely that the user will be overwhelmed by the analysis. In addition, presenting statistical analysis on the most interesting parts of the data is advantageous because it enables the user to be better able to apply insights gathered from the analytics software to decision making. The improved analytics software is described in detail below.

As such, the improved analytics system describes herein automates the discovery of information that would otherwise be done by an analytics user. Instead of the user having to manually construct visualizations and navigate, pivot, and break down the information in different manners to discover the meaning of a data point, this improved analytics system performs statistical analysis on datasets containing hierarchical data to provide the next-level insights to users. Advantageously, this the improved analytics system may result in faster workflows and may allow application users to focus on higher level tasks.

Analytics System

An analytics system may be configured to analyze a dataset, visualize the data, make predictions, and enable users to gather insights on the data. In some embodiments, the analytics system may operate on large datasets. In some situations, the analytics system may be provided using "cloud computing" techniques. For example, front-end computers may access data stored at remote back-end computers over a network, where such remote data may be referred to as being "in the cloud."

FIG. 1 shows a diagram of an analytics system including a front-end computer 150 and a back-end computer 170, according to an embodiment. The front-end computer 150 may be referred to as a "front-end computer" because it can provide a software user interface to a user of software or a database running on the "back-end computer." The user may see and be aware of the front-end but not the back-end. The front-end computer 150 may be a server computer, a system of more than one computer, or a user device, for example. The front-end computer 150 provides the front-end of the improved analytics system described herein. The front-end may include a user interface software module 151, a chart and graph software module 152, a front-end storage software module 153, a dimension candidate scoring software module 154, and a dimension candidate retrieval software module 155. The front-end computer 150 may further includes other software modules.

The back-end computer 170 may be a server computer or a system of more than one computer, for example. The back-end computer 170 provides back-end processing for the improved analytics software described herein. The back-end computer 170 may include software modules for platform tools 172, a back-end storage software module 172, a dimension candidate provisioning software module 173, and a dimension statistics calculator software module 174. The back-end computer 170 may further includes other software modules. The front-end computer 150 and the back-end computer 170 may be configured to communicate with each other over a network (not shown in FIG. 4), such as the Internet or an intranet.

The user interface software module 151 of the front-end computer 150 may provide rendering and presentation of a user interface for the analytics software. In some embodiments, the front-end computer 150 may provide the user interface by hosting a website that can be accessed by other computing devices. For example, the website may be accessed a desktop computer, a laptop computer, a tablet, or a smart phone, for example. In other embodiments, the front-end computer 150 may provide the user interface directly. For example, the front-end computer 150 may execute analytics software and provide a user interface for operating the analytics software.

The user interface module 151 may be configured to present an interface for interacting with visualization data generated by a chart and graph software module 152. The chart and graph module 152 may be configured to generate visualization data for presenting charts and/or graphs. The charts and/or graphs may be based on measures and dimensions of a model generated based on a dataset. The dataset may be formatted from source data (e.g., reports or logs) and a model may be generated based on the data set.

The front-end computer 150 may retrieve the model or information on the model from the back-end computer 170 or from a separate database system, such as an analytics database 160, for example. The data retrieval software module 155 may be configured to request such information from the back-end computer 170. This information may be stored and managed by the front-end storage software module 153. The information may be stored in memory or in a file system of the front-end computer, for example. The information may also be stored at the analytics database 160, for example.

As described herein, a "model" may refer to a data structure used to organize and store source data. For example, the model may organize income statement data into rows and columns of a table, where each column in the model is a measure or a dimension. Models may provide for the source data to be visualized, in a chart, graph, or table, for example. A "measure" may refer to a set numerical values in a model. For example, quantity sold, sales revenue, gross profits, and sales price may be measures in the model. Values of the same measure can be summed together to get a cumulative value. A "dimension" is a qualitative description of the data in the model. For example, product type, country, currency, and category code may be dimensions in the model. The dimensions may be hierarchical. For example, a "product" dimension could include "apparel," "footwear," and "accessories" as children of "all products." In this example, "accessories" could include "gloves" and "caps" as children. As such, the dimension may be represented as a branching tree having nodes, where the root node is "all products" and the first level down in the tree includes nodes representing "apparel," "footwear," and "accessories," and so on down the tree. In another example, a "currency" dimension could include "US Dollars," "Canadian Dollars," and "Euros." The currency dimension may be referred to as a "flat dimension" because there may be no children of the currencies "US Dollars," "Canadian Dollars," or "Euros."

Before creating the visualizations and analyzing the data the user may need to load the dataset into the software. In some embodiments, the user may use the user interface module 151 to select certain measures and dimensions of the model to be used for chart/graph generation and analysis. The information for the model and other data required for the analytics software may be stored and later retrieved by the front-end storage module 153. The front-end storage module 153 may cache or store the data required for the analytics software locally at the front-end computer 150 (e.g., in memory or in disk storage) or it may store the data in a separate database system.

The analytics software can enable a user to select certain dimensions of the data to be analyzed (e.g., by selecting a portion of the charts and graphs generated by the chart and graph software module 152). The analysis can determine which other dimensions of the model contribute to or influence the selected dimension the most, for example. In order to perform this analysis, the analytics software can use a dimension candidate scoring software module 154 to rank which other dimensions of the model are the top contributors or the most influential. The scoring may be based on how much certain nodes within the model deviate from other related nodes. Where the deviation can be indicative of data that would be of interest to the user of the software. The scoring process may involve determining an average of a measure associated with nodes of the dimension candidate, for example. In order to score the dimensions of the model, a set of dimension candidates can be retrieved from the back-end computer 170 using a dimension candidate retrieval software module 155. In some embodiments, the dimension candidate retrieval software module 155 may communicate with a dimension candidate provisioning software module 174 of the back-end computer 170 to retrieve dimension candidates to be scored by the dimension candidate scoring software module 154. The dimension candidates and their scoring are described in further detail below.

The data retrieval software module 155 of the front-end computer 150 may communicate with the data provisioning software module 174 of the back-end computer 170, using HyperText Transfer Protocol (HTTP) for example. The data retrieval software module 155 of the front-end computer 150 may send a request for dimension candidates to the back-end computer 170, for example. The request may contain information regarding the selected context (e.g., dimension selected by the user and/or the chart or graph information).

As mentioned above, the analytics system may also include an analytics database 160, which may be in communication with the front-end computer 150. In some embodiments, the analytics database 160 may store the dataset and other information related to dimension candidate scoring. In some embodiments, the front-end computer 150 may request and retrieve portions of the dataset from the analytics computer 160 instead of the back-end computer 170.

The data provisioning software module 173 of the back-end computer 170 may determine and obtain a set of dimension candidates based on the context information included in the request and send the dimension candidates to the front-end computer 150. The response message sent from the back-end computer 170 to the front-end computer 150 may contain the description of each valid dimension candidate and may indicate whether the dimension candidates are hierarchical dimensions or flat dimensions.

The statistics software module 174 of the back-end computer 170 may determine cardinality information and other parameters of the dimension candidates. The back-end computer 170 may use the cardinality information (e.g., number of descendants in a particular subset of the dimension) to determine the set of dimension candidates to send to the front-end computer 150. In some embodiments, the back-end computer 170 may determine that dimensions having only a single node are not relevant and may not be dimension candidates, for example. In some embodiments, the back-end computer 170 may determine that dimensions having too many nodes (e.g., above a threshold) are not relevant and may not be dimension candidates. The dimension statistics calculator of the back-end computer 170 may perform pre-calculations of cardinality information for each dimension candidate, along with the pruning of the candidates as further described below. The cardinality information and dimension statistics may be stored by (and later retrieved by) the back-end storage software module 173. In some embodiments, the cardinality information may be stored as a hash map.

The dimension statistics and cardinality calculations may be triggered based on data update events. For example, whenever there is a change in the source data or the metadata for the source data, the cardinality information may be recalculated for each affected dimension. This approach reduces computational resources used because the statistics are only calculated when they are changed (e.g., they are not calculated upon every request or at set intervals).

The back-end computer 170 may also include a platform tools software module 172. The platform tools software module 172 may provide for authentication of users, access to dataset metadata, and may perform updates to the dataset.

The functionality provided by the back-end computer 170 may be referred to as a "microservice" because the software functions performed by it are "light," meaning that the back-end computer 170 does not perform all of the necessary computations (some computations may be performed by the front-end computer 150, for example).

User Interface

As mentioned above, the user interface of the analytics software can present charts and graphs of a model dataset and enable a user to analyze the information to gather insights.

Figure 2:
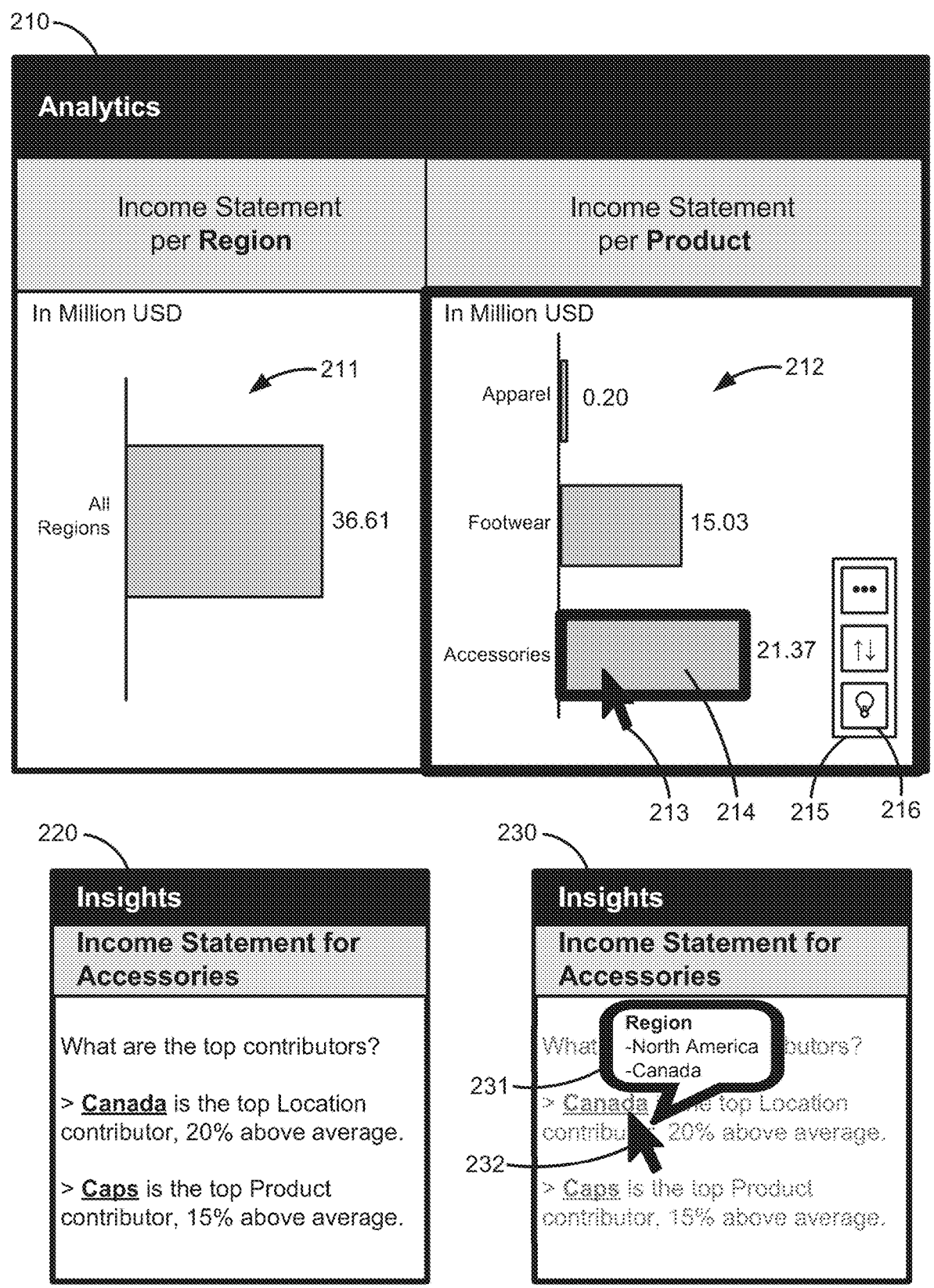
FIG. 2 shows exemplary user interfaces presented by the front-end computer of the analytics system of FIG. 1, according to an embodiment.

FIG. 2 shows exemplary user interfaces presented by the front-end computer of the analytics system of FIG. 1, according to an embodiment. In this embodiment, the analytics system may have loaded an income statement model based on an income statement dataset. The income statement model may be based on an "income" measure (which may be selected by the user) and "region," "product," and "currency" dimensions (which may also be selected by the user). The first user interface 210, the second user interface 220, and the third user interface 230 may include information based on the income statement module.

In this exemplary embodiment, the first user interface 210 may present two charts including a first chart 211 for income statements by "region" and a second chart 212 for income statements by "product," where region and product are dimensions of the income statement model and "income" (in million USD) is the selected measure of the model. As shown in the first chart 211 of the first user interface 210, the income statement model include a total value of 36.61 million USD for all companies in "all regions." As shown the second chart 212 of the first user interface 210, the total value of 36.61 million USD for all companies includes income per product: 0.20 million USD of "Apparel," 15.03 million USD of "Footwear," and 21.37 million USD of "Accessories."

As mentioned above, a user reviewing the first user interface 210 may want to determine which portions of the income statement model are the tops contributors or more influential to other portions of the data. That is, the user may want to see statistics for the highest scored dimension candidates. In one example, the user may want to determine the top contributors to the "accessories" dimension. To perform dimension candidate scoring based on the "accessories" dimension value, the user may initiate a process that retrieves the dimension candidates, scores them, and presents statistics on the top scored candidates. In some embodiments, the user may select the "accessories" bar graph 214 using a pointer 213 (e.g., a mouse pointer or touchscreen pointer), which causes a tool bar 215 to popup. The toolbar 215 may include a button or icon 216 to initiate analysis of the selected dimension to determine the top contributors, as further discussed below. In other embodiments, the button 216 for initiate the analysis process may be positioned elsewhere in the user interface. In some embodiments, the analysis process may be initiated upon selection of a dimension by the user.

After the analysis is performed, the user may be presented with the second user interface 220, for example, which based on the selected dimension (e.g., "accessories" in the example above). The second user interface 220 shows the top contributors to the "accessories" dimension. As shown in FIG. 2, "Canada is the top Location contributor, 20% above average" and "Caps is the top Product contributor, 15% above average." As shown in the third user interface 230, the users is able to hover over "Canada" with their pointer 232 and see a popup showing the members of the hierarchical dimension and see the drill down information. For example, the popup can show that the "region" dimension includes "North America," which includes "Canada." Calculation of such statistics is further described below.

These statistics are advantageous because the user can apply the insight provided by the statistics to their decision making on "accessories" products and other dimensions. Furthermore, the user knows exactly which level in the hierarchical data provides the greatest contribution. That is, the user knows that "Canada" specifically (instead of "North America" generally) is a top contributor to "accessories."

Having insight into the hierarchy is advantageous because it enables the user to make identify better targets for decision making. Certain prior analytics software are not configured to provide statistical insights with respect to different levels of hierarchical data. As such, the analytics software described herein provides advantages and improvements over certain prior analytics software.

As discussed above, the charts and graphs shown in FIG. 2 can present information for the "income" measure and the "region" and "product" dimension of an income statement model. The income statement model may include other measures and dimensions that can be selected by the user to be included in the charts and graphs.

Figure 3:
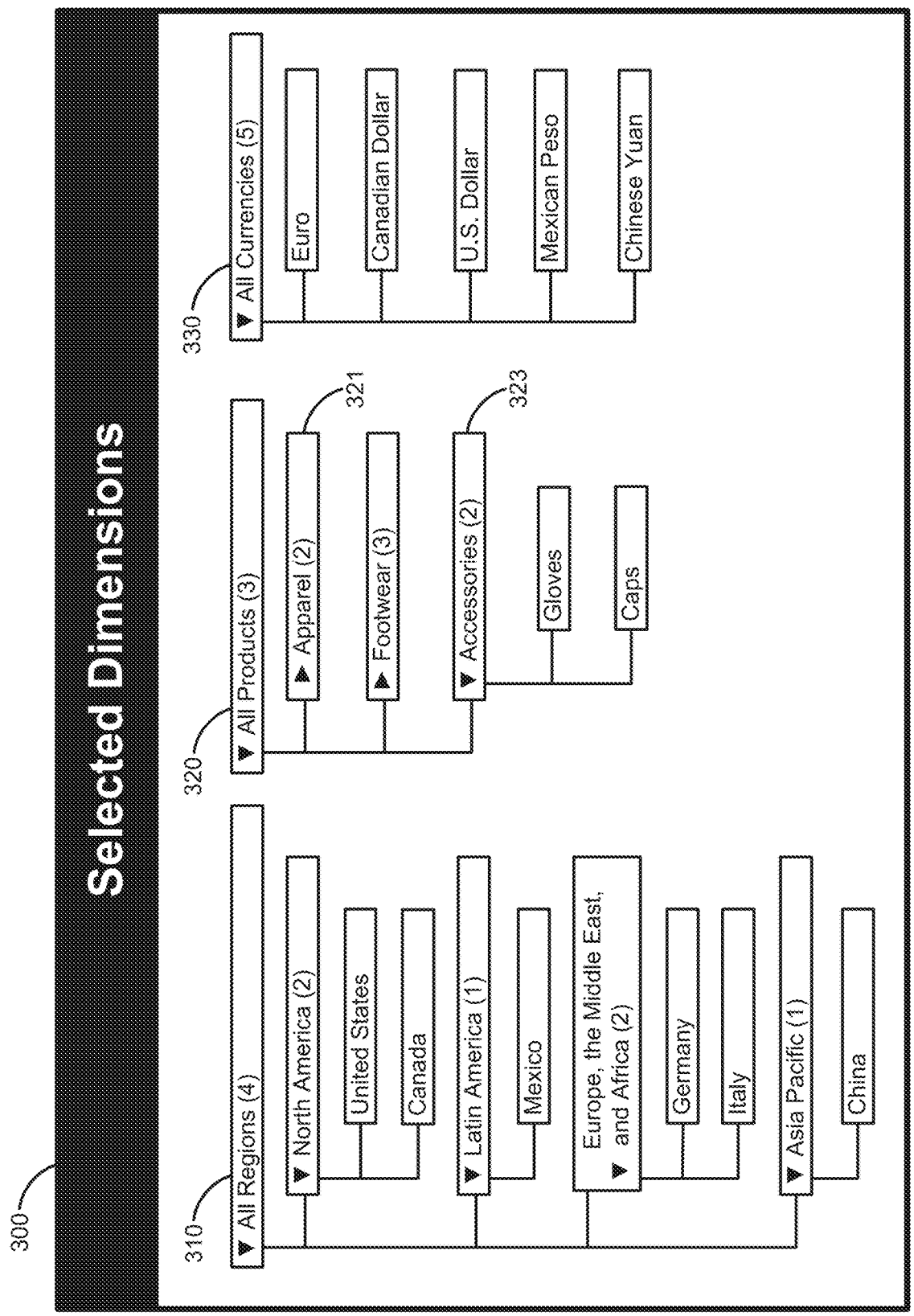
FIG. 3 shows a user interface with a diagram of hierarchical data in a model, according to an embodiment.

FIG. 3 shows a user interface 300 with a diagram of data in a model, according to an embodiment. In this embodiment, the selected model data includes a hierarchical "region" dimension 310, a hierarchical "product" dimension 320, and a flat "currency" dimension 330. The "region" dimension 310 and the "product" dimension 320 may be referred to as "hierarchical" dimensions because these dimensions can be represented as a tree diagram with a root node branching to member nodes, until a leaf node is reached.

For example, as shown in FIG. 3 the "region" dimension 310 includes "United States" and "Canada," which are leaf nodes and descendants (e.g., "children") of "North America." "Mexico" is a leaf node and a descendant of "Latin America." "Germany" and "Italy" are leaf nodes and descendants of "Europe, the Middle East, and Africa," "China" is a leaf node and descendant of "Asia Pacific." And "North America," "Latin America," "Europe, the Middle East, and Africa," and "Asia Pacific" are all descendants of the root node "All Regions."

As shown in FIG. 3, the "product" dimension 320 includes "gloves" and "caps" which are leaf nodes and descendants of "Accessories" 323. "Apparel" 321, "Footwear," and "Accessories" 232 are descendants of the root node "All Products." As shown in FIG. 3, the "Apparel" node 321 is collapsed so that the children are not shown in the user interface 300. However, the user interface states "Apparel (2)" to indicate that the Apparel node has two children. Similarly, "Footwear (3)" indicates that the Footwear node has three children.

As shown in FIG. 3, the currency dimension 330 includes "Euro," "Canadian Dollar," "U.S. Dollar," "Mexican Peso," and "Chinese Yuan." The currency dimension 330 may be referred to as a "flat" dimension because all of the children are in the same level of the tree. That is, all of the nodes are children of the root node "All Currencies."

The "region," "product," and "currency" dimensions may not be the only dimensions in the model. In this example, these dimension may be the ones selected by the user to be included in the charts and graphs representing the model. In other embodiments, other dimensions of the model may be selected to be included in the charts. In other embodiments, a different model may be selected for visualization in charts and graphs. The hierarchies of the dimensions are further described below.

Dimension Candidates

As discussed above, a user viewing a chart based on a dataset may want to identify the top contributors to a portion of that data and see statistics for those top contributors. For example, as shown in FIG. 2, a user may request statistics on an "accessories" dimension value of an income statement model. To do this, a front-end computer may request dimension candidates from a back-end computer, sort and rank the dimension candidates, and score the dimension candidates, where the top scoring dimension candidates are the top contributors.

In order to determine the dimension candidates, the back-end computer may determine the cardinality value for each node in trees representing the dimensions and filter the dimension candidates according to the cardinality values. The back-end computer may also include a dimension identifier (identifying a particular dimension), a chart-usage identifier (whether the dimension is used in the chart selected by the user or not), and a level indicator (e.g., one or both of an absolute level value indicating a particular level in the tree and a drill down indicating a relative level in the tree with respect to the selected node or the root node).

The dimension candidate selection process and algorithms used are further described below.

Figure 4:
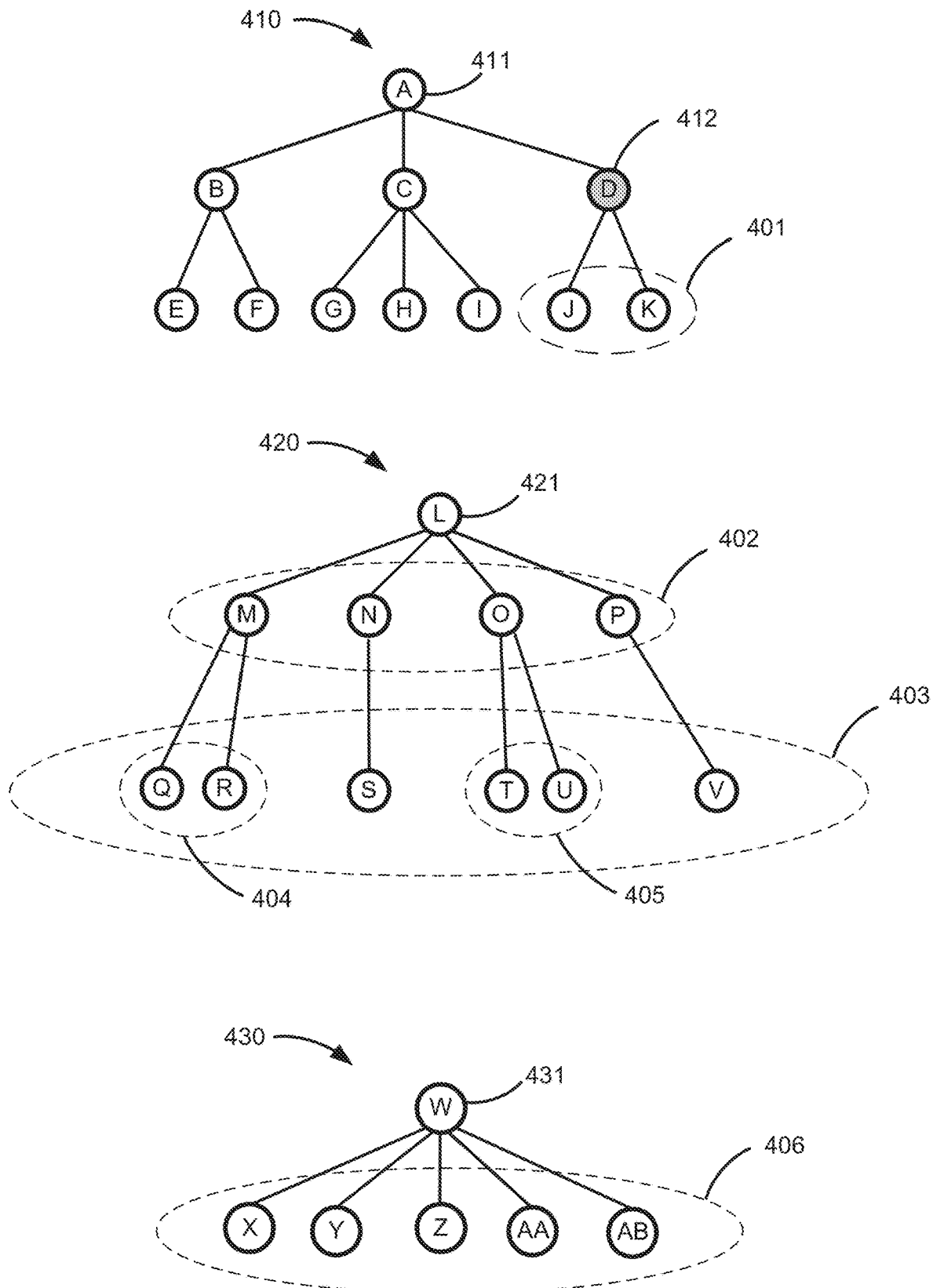
FIG. 4 shows tree diagrams of dimensions and dimension candidates, according to an embodiment.

FIG. 4 shows tree diagrams of dimensions and dimension candidates, according to an embodiment. In FIG. 4, dashed lines are used to indicate groupings of nodes that are within the same dimension candidate. The dimension candidates shown in the trees in FIG. 4 are described in the Table 1 below. The "Candidate" field indicates the name of the dimension candidate. The "dimension" field indicates the dimension of the model that the dimension candidate is in. The "Is Used" field indicates whether the corresponding "dimension" is being used in the chart or graph selected by the user. The "Level" field indicates the absolute level of the descendants in the hierarchy (e.g., where the root is at level "1," and one level down from the root is level "2," and so on down the hierarchy). The "Drill" indicates the relative level down from the selected node. This may also be described as a "drill down" from a particular node. The "Cardinality" field indicates the number of descendants in the dimension candidate.

TABLE 1

Dimension Candidates

| Candidate | Dimension | Is Used | Level | Drill | Cardinality |
|---|---|---|---|---|---|
| D + 1 | Product | True | 3 | 1 | 2 |
| L + 1 | Region | False | 2 | 1 | 4 |
| L + 2 | Region | False | 3 | 2 | 6 |
| M + 1 | Region | False | 3 | 1 | 2 |
| O + 1 | Region | False | 3 | 1 | 2 |
| W | Currency | False | — | — | 5 |

As further described below, the information shown in Table 1 may be used by the front-end computer to sort the dimension candidates received from the back-end computer. The front-end computer may select a subset of the sorted dimension candidates to be scored. In some embodiments, the scoring process may determine the highest contributor within each dimension candidate and determine how much it is deviating from the average value of all components. to get a deviance score for each top contributor within each dimension. Such deviance scores for the dimension candidates may indicate which dimension candidates are the most interesting dimensions (e.g., where the top contributor is significantly deviating from the average). The front-end computer may rank the scored dimension candidates based on their deviance score and present statistics (e.g., with respect to the average) in the user interface. The sorting and scoring of dimension candidates is further described below.

The trees representing the dimensions in FIG. 4 correspond to the dimensions shown in FIG. 3. A first tree 410 having a first root node 411 corresponds to the "region" dimension. A second tree 420 having a second root node 421 corresponds to the "products" dimension. A third tree 430 having a third root node 431 corresponds to the "currency" dimension. As shown in FIG. 2, the user may select "accessories" 214 in the chart 212 for "product" dimension. In FIG. 4, the selected node 412 (labeled as "D" and filled with the color gray) corresponds to "accessories."

In order to provide meaningful statistics on a selected dimension, the dimension candidates may be configured based on the structure of the hierarchy. The dimension candidates may include information on the identifier of the starting node, the absolute level on the hierarchy, the number of levels under the selected node, and the number of nodes that are at each level of the drill down, for example. To determine dimension candidates, the descendant cardinality (e.g., the number of direct descendants) may be calculated for each node in the tree, at each drill level. That is, for each node, the tree should be traversed (starting from that node) and the number of descendants per level should be determined. In some embodiment, the drill down of the tree may proceed until a leaf node is encountered to avoid imbalanced trees. In some embodiments, the tree traversal and dimension candidate generation is performed by the back-end computer, as further described below. The back-end computer may provide a set of the generated dimension candidates to the front-end computer in response to a request received from the front-end computer.

Based on the tree traversal, the dimension candidate generation process may determine six dimension candidates: D+1, L+1, L+2, M+1, P+1, and W+2. As shown in FIG. 4, dimension candidate D+1 is based on node D 412 (representing "Accessories") and includes a first set of nodes 401 including node J and node K (representing "Gloves" and "Caps"). For the "products" dimension 410, the other subtrees starting at node B and node C may not be dimension candidates since node D was selected by the user (e.g., the user selected "Accessories" in the chart, which is represented by node D). Dimension candidate D+1 is referred to as "D+1" because it includes the nodes that are 1 level down from node D.

As shown in Table 1 above, dimension candidate D+1 is in the "product" dimension, it is used in the chart (Is Used=true), the nodes in the dimension candidate are at level 3 of the tree 410, the drill down from node D is 1 (e.g., one level down from node D), and the cardinality is 2 (e.g., two nodes are in the dimension candidate, the two nodes being J and K).

As shown in FIG. 4, dimension candidate L+1 includes a second set of nodes 402 including node M, node N, node O, and node P. Dimension candidate L+1 may identify node L 421. As shown in Table 1, dimension candidate L+1 is in the "region" dimension, it is not used in the chart (Is Used=false), it is at level 2 of the region tree 420, it has a drill down of 1 (one level down from L), and it has a cardinality of 4 (there are 4 nodes, including M, N, O, and P).

Dimension candidate L+2 includes a third set of nodes 403 including node Q, node R, node S, node T, node U, and node V. Dimension candidate L+2 is in the "region" dimension, it is not used in the chart, it is at level 3 of the region dimension tree 420, it has a drill down of 2 (two levels down from node L), and it has a cardinality of 6 (based on the 6 nodes Q, R, S, T, U, and V).

Dimension candidate M+1 includes a fourth set of nodes 404 including node Q and node R. Dimension candidate M+1 is in the "region" dimension, it is not used in the chart, it is at level 3 of the region dimension tree 420, it has a drill down of 1 (one level down from node M), and a cardinality of 2 (based the 2 nodes Q and R).

Dimension candidate N+1 has a cardinality of 1 because its only descendant is node S. A dimension candidate having a cardinality of 1 may not be able to provide important information to the user as there are no other nodes within the dimension candidate to be used for comparison. Therefore, dimension candidate N+1 may be filtered out from the dimension candidates to be sent to the front-end computer. Likewise, dimension candidate P+1 may be filtered out from the dimension candidates to be sent to the front-end computer because it only includes 1 node, node V.

Dimension candidate O+1 includes a fifth set of nodes 405 including node T and node U. Dimension candidate O+1 is in the "region" dimension, it is not used in the chart, it is at level 3, it has a drill down of 1 (one level down from node O), and it has a cardinality of 2 (based on nodes T and U).

Dimension candidate W for the "currency" dimension includes a sixth set of nodes 406 including node X, node Y, node Z, node AA, and node AB. The "currency" dimension is a "flat" dimension since all of the nodes are leaf nodes of the root node. Accordingly, dimension candidate W may be treated as a flat dimension. As shown in Table 1 above, dimension candidate W is in the "currency" dimension, it is not used in the chart, it does not have a Level as it is a flat dimension (e.g., Level is set to "-"), it does not have a drill down as it is a flat dimension (e.g., Drill is set to "-"), and it has a cardinality of 5 (based on nodes X, Y, X, AA, and AB).

Sorting Dimension Candidates

As mentioned above, the front-end computer may soft the dimension candidates received from the back-end computer. The front-end computer may select a subset of the sorted dimension candidates to score in order to reduce the computational resources spent in the scoring process. The sorting processing may consider the cardinality of the dimension candidate, the level of the dimension candidate (e.g., absolute level), whether the dimension is used in the chart or not (e.g., whether the "Is Used" field is true or false), and whether another dimension candidate from the same dimension has already been selected (e.g., the sorting process may prefer a varied dimension candidate selection).

The sorting process may weigh the considerations differently. In one example sorting processing, the dimension candidates received from the back-end computer may be sorted, in order of importance, based on whether the dimension is used, the absolute level of the dimension candidate in the hierarchy, the cardinality value of the dimension candidate, and then the display level of the dimension candidate in its hierarchy. As mentioned above, the dimension candidates received from the back-end system may include the "Is Used," "Level," "Drill," and "Cardinality" information. Using this example sorting process, the dimension candidates shown in Table 2 below may be sorted, by importance, in the following order: B+2, C, B+5, D, A+1, A+2.

TABLE 2

Dimension Candidates

| Candidate | Dimension | Is Used | Level | Drill | Cardinality |
|---|---|---|---|---|---|
| A + 1 | A | True | 2 | 1 | 4 |
| A + 2 | A | True | 3 | 2 | 8 |
| B + 2 | B | False | 4 | 2 | 2 |
| B + 5 | B | False | 5 | 5 | 23 |
| C | C | False | — | — | 5 |
| D | D | True | — | — | 2 |

As mentioned above, the front-end computer may send a request for dimension candidates to the back-end computer. The request may include information indicating a node selected by the user (e.g., based on an element of graph or chart selected by the user) and the dimension of the model that the node is in. The back-end computer may determine a set of dimension candidates based on the information included in the request. The back-end computer may have previously determined descendant information and cardinality information for the model in response to updates to the underlying dataset or data source. Such information may be stored as a hash map, for example.

Scoring Dimension Candidates

After the front-end computer sorts the dimension candidates, a subset of the sorted dimension candidates may be selected (e.g., a certain number or a certain percentage). Selecting a subset for scoring is advantageous because it may reduce the computing resource spent in performing the scoring compared to scoring the entire set of dimension candidates received from the back-end computer. The nodes having the highest value in the top scoring dimension candidates may be referred to as a "top contributor" of the corresponding dimension. Such nodes may deviate the most from the average value of the measure of the dimension, as further explained below.

The scoring process analyzes a selected measure of the model (e.g., number of sales, income, etc.). For each available dimension within a model, the selected measure may be broken down to analyze which components has the highest contribution (e.g., highest absolute value) to the overall value. For example, if a measure of the model is "Sales in Product where Product is Caps" and available dimensions are "color" and "size," the value 100 (e.g., 100 sales) could be broken down by "color" or by "size." In this example 70 of the 100 caps sold are the color gray and 30 of the 100 caps sold are the color black. Furthermore, in this example, 50 of the 100 caps sold are size small, 40 are size medium, and 10 are size large.

As mentioned above, the improved analytics system described herein provides the advantage of not overwhelming the user with information. To achieve this, the scoring processes may determine the top contributor within each dimension breakdown. This may be done by determining how much the top contributor is deviating from the average value of all components, for example. In one example, a deviance score may be determined by subtracting the average value of all components of the dimension from the maximum value of the components, and then dividing by the average (e.g., (max−average)/average). In situations where the average is negative, the deviance score may be determined using lowest number (e.g., (min−average)/average). The scoring process may determine a score for each top contributor within each dimension.

Using the example given above, the maximum value for the "color" dimension is 70, the minimum value for "color" is 30, the average value for "color" is 50, and the score for "color" is 0.4. In that example, the maximum value for the "size" dimension is 50, the minimum value for "size" is 10, the average for "size" is 33.33, and the score for "size" is 0.5. As such, the score for "size" is greater than the score for "color." And so "size" would be the top contributor to sales (the measure) in products (the dimension) where the product is "caps."

The most interesting dimensions (e.g., that are valuable to the user for decision making) may occur where the top contributor is significantly deviating from the average. Therefore, the dimensions to be presented to the user may be those having the highest scores. The front-end computer may determine the number of top contributors to be presented to the user. Statistics for the top contributors (e.g., deviation from the average) may be presented to the user in the user interface along with the corresponding chart or graph selected by the user. For example, the statistics may be presented in a pop-up window near the chart, or in a frame or window alongside the chart, or in the same frame or window as the chart. In the example given above, statistics (e.g., how much above the average the top contributor is). on "caps" may be presented along with a chart showing information on the product dimension.

Determining Dimension Candidate Information

Figure 5:
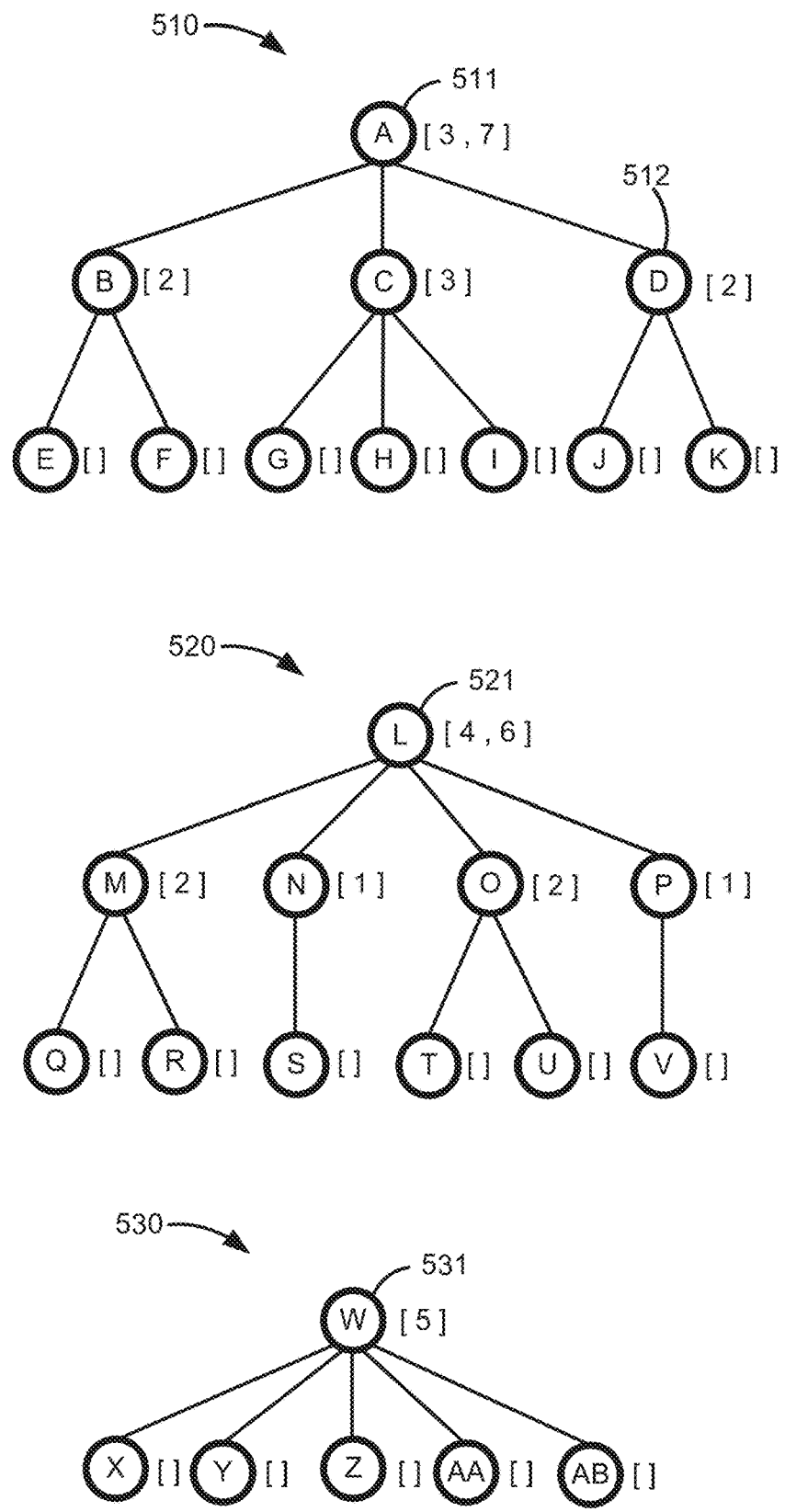
FIG. 5 shows tree diagrams of dimensions and descendant arrays corresponding to the nodes of the trees, according to an embodiment.

FIG. 5 shows tree diagrams of dimensions and descendant arrays corresponding to the nodes of the trees. The trees representing the dimensions in FIG. 5 correspond to the dimensions shown in FIG. 3. The descendant arrays corresponding to each node (shown to the right of the node in FIG. 5) and other descendant information may be stored back-end computer. For example, the descendant information may include metadata for each node (e.g., dimension member). The metadata may include a node identifier. The metadata may also include a parent identifier (e.g., if the dimension has a hierarchy). These node identifier and the parent identifier for each node may be used to able to reconstruct the dimension hierarchy.

Using this information, the back-end computer may construct a hash map where the parent node identifier is the key and the corresponding values is an object containing an array of child node identifier and the level identifier of the selected or root node. With this hash map, the list of direct children (e.g., descendants) for any node may be looked up in O(1) time and the storage complexity may be O(N). Thus, the next level dimension candidate may be determined using the hash map.

As discussed above, a dimension candidate may include the following information: a node identifier (e.g., the identifier of the relative root node or starting node), the Drill (e.g., the number of levels navigated down the tree), the Level (e.g., the absolute level from the true root the tree), and the Cardinality (e.g., the number of descendants at the relative level). To generate each possible dimension candidate for a model, the lookup may be done recursively. In some embodiments, the back-end computer may pre-calculate the cardinality numbers for each node and the other dimension candidate information (e.g., before receiving the request from the front-end computer). In some embodiments, the lookup may be done on demand (e.g., in response to receiving the request). Pre-calculating the cardinality information and dimension information is advantageous because it may enable the dimension candidates to be generated using a single tree traversal, thereby reducing computations resources and time used when responding to the request.

By recursively looking up the children for each node (e.g., starting with the node with identifier blank/null—representing the parent of root nodes), the back-end computer may navigate the tree and identify the nodes that do not have children (e.g., nodes that have an empty child array). By propagating and aggregating the child array count information upwards, the number of descendants at each level can be calculated out. The tree traversal process is described below. The results of the tree traversal may be transformed into the hash map that allows the lookup of the list of children for each node.

Referring to the trees in FIG. 5 as examples, tree traversals may be performed as follows. The first tree 510 representing the "region" dimension has a first root node A 511. The tree traversal may be recursive, looking for a leaf node, which may have an empty descendant array as there are no children of a leaf node. As shown in FIG. 5, nodes E, F, G, H, I, J and K may be leaf nodes and have empty descendant arrays (shown as "[ ]" in FIG. 10, to the right of the associated node). An empty descendant array means that there is no next level in the tree. Therefore, the node can return an empty array up to its parent node. For example, nodes E and F may each return an empty array to node B. Nodes G, H, and I may each return an empty array to node C. And nodes J and K may each return an empty array to node D. Throughout the tree traversal process, once the descendants' array has been calculated for a node, the value may be added to a descendants hash map where the key is the node identifier, and the value is the descendant array. This process is advantageous because it may enable quick lookup of the potential dimension candidates.

In the tree traversal process, each node may keep track of the cardinalities of its descendants in its associated descendant array. The number of direct children (the size of the child arrays) may be added as the first entry to the direct children array of each node. If it has no direct children, the array is empty (as per the previous step). Take the example of node B. It has two children, nodes E and F. Therefore, the descendant array for node B may have the value "2" at position "0." Both node E and F have no children and so they have returned an empty array. This means that no additional values may be added to node B's descendant array. In this example, looking up the descendants of node B using the hash map may return the array [2]. This indicates that from B a traversal may drill down by one level and find two nodes. As there are no further values in the array for node B, this indicates that only a one-level drill down may be performed before reaching the leaf nodes.

During the tree traversal process, when a child returns an array of descendant cardinalities, the values for each child may aggregated and appended to the descendant array. Take node A for example. Node A has 3 direct children (e.g., nodes B, C, and D) and so the value at position 0 in the descendant array for node A is 3. In this example, nodes B, C, and D have returned a non-empty descendants list. This means that the descendant array of each child may be aggregated together and appended to the parent's descendants list. For example, when the descendant array of B=[2], C=[3], and D=[2] are aggregated, the resulting array will be [7]. The array aggregation may sum up each corresponding entry within the child arrays to create a new amalgamated array. When this result is appended to the descendant array of A, the result is [3, 7]. This descendant array indicates that there are two possible drill downs starting from node A. There are 2 nodes when drilling down one level in the hierarchy and 7 nodes when drilling down two levels.

In some situations, a sub-trees starting from a particular node may not have the same depth. This means that the sub-tree expressed by the node is "imbalanced." For the tree traversal process, drill downs may be valid until a leaf node is encountered.

As shown in FIG. 5, the second tree 520 representing the "product" dimension has root node L 521 having a descendant array of [4, 6]. This descendant array is a result of node L having four direct children (e.g., nodes M, N, O, and P) and those direct children having a total of six children (e.g., nodes Q, R, S, T, U, V).

As shown in FIG. 5, the third tree 530 representing the "currency" dimension has root node W having a descendant array of [5], which is a result of node W having five direct children (e.g., nodes X, Y, Z, AA, and AB), which are leaf nodes. Since the root node W 531 of the third tree 530 has only leaf nodes, the "currency" may be a flat dimension.

Once the descendant arrays for all of the nodes of the dimensions of the model have been calculated, the tree traversal will have created the descendants hash map, which may be accessed in response to receiving a request from the front-end computer in order to determine the dimension candidates.

Figure 6:
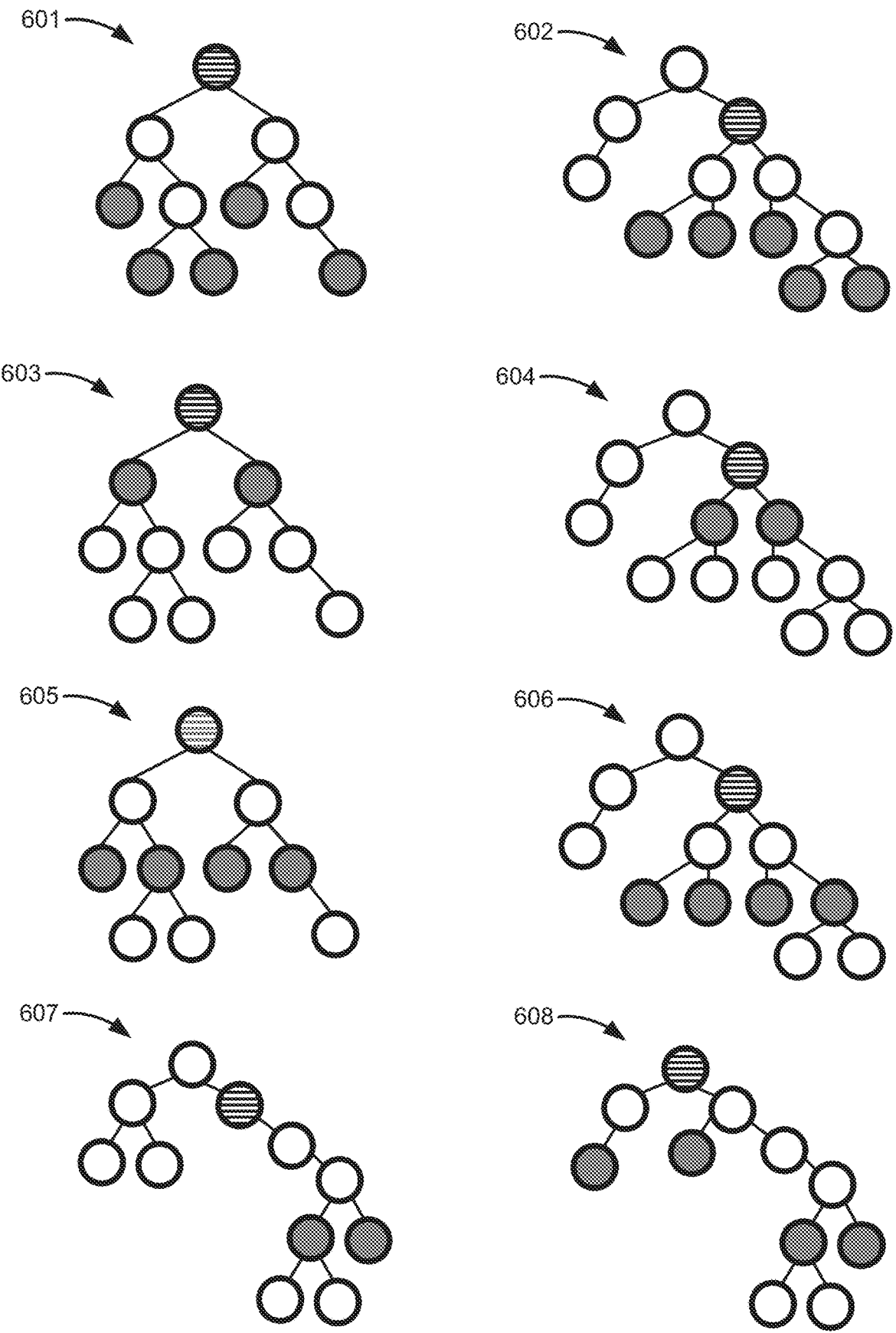
FIG. 6 shows tree diagrams of different scenarios for determining dimension candidates, according to an embodiment.

FIG. 6 shows tree diagrams of different scenarios for determining dimension candidates, according to an embodiment. The first scenario is represented by a first tree diagram 601. The second scenario is represented by a second tree graph 602. The third scenario is represented by a third tree graph 603. The fourth scenario is represented by a fourth tree graph 604. The fifth scenario is represented by a fifth tree graph 605. The sixth scenario is represented by a sixth tree graph 606. The seventh scenario is represented by a seventh tree graph 607. The eighth scenario is represented by an eighth tree graph 608. In FIG. 6, the default member of the dimension (e.g., the root node or relative root node) is indicated by the node being filled horizontal bars and the nodes within the dimension candidates are indicated by being filled with the color gray.

As further described below, some scenarios may remove any dimensions from the list of candidate dimensions that are to be considered if they are already part of the breakdown of the measure (e.g., they are included in the chart presented to the user). However, the user may obtain valuable statistics and insights on dimensions that are already used in the breakdown. For example, contributors on the next-level of the hierarchy may provide insights about information that is hidden by an aggregation (e.g., the next-level data is not shown in the chart). There are several scenarios that can be enabled for determining the top contributors for hierarchical data.

With these scenarios, the dimension candidate generation process is extended to not only consider the dimensions not part of the breakdown but to also generate additional candidates for each level of the hierarchy. The dimension candidate selection algorithm may calculate the cardinality of the hierarchical candidates and select a subset of all candidates to be used as a reduced search space. This algorithm is advantageous because the computational resources used in dimension candidate selection may be reduced by performing the score calculations on a smaller set of candidates. The dimension candidate selection algorithm is further improved by using properties such as drill number, absolute level of the hierarchy, cardinality (number of members represented by candidate), and whether candidate is in the break down such that the dimension candidate selection takes the hierarchy into account. In addition, the dimension candidate selection algorithm may ensure that the breakdown represented by a hierarchical candidate adds up to the original number that is being broken down, as discussed above.

In the first scenario represented by the first tree diagram 601, the dimension candidate selection algorithm may treat hierarchies as flat dimensions by expanding the hierarchy to the leaf nodes. For example, when the dimension candidate selection encounters a hierarchical dimension, it expands the full tree starting from the default member (e.g., root node). and uses the leaf nodes for the scoring equation. As shown in the first tree diagram 601, all of the leaf nodes are selected to be within a dimension candidate in the first scenario.

In the second scenario represented by the second tree graph 602, the dimension candidate selection algorithm expands the relative hierarchy to the leaf-nodes by treating the default member (e.g., the node selected by the user) as the root. This scenario may provide an additional dimension candidate for used dimensions (e.g., for dimensions user in the chart).

In the third scenario represented by the third tree graph 603, instead of using the leaf nodes, a dimension candidate can be determined by expanding the tree by a single level. Given this smaller tree, the leaf nodes are no longer the true leaves of the dimension and instead they correspond to the second level of the hierarchy. For dimensions that are not used in a chart, the dimension candidate selection algorithm may set the default member as the relative root node in the selection.

In the fourth scenario represented by the fourth tree graph 604, when a dimension is already used in a chart, the dimension candidate selection algorithm may be triggered from a data point or variance that is associated with a specific node in the hierarchy. The selected node (e.g., shown with horizontal bars) may be treated as the root node for the selection and the next level navigation may be relative from that node. The selection used for the aggregation should evaluate to the children of the relative root node.

In the fifth scenario represented by the fifth tree graph 605, additional dimension candidates may be generated for the dimension starting from the root node of the hierarchy until the first level that contains leaf nodes. In this scenario, the maximum number of level candidates may not exceed the maximum depth of the tree. That is, the first level (ordered by depth) that contains a leaf node may be considered as the last valid dimension candidate. The remaining candidates may be discarded (e.g., they are not dimension candidates that are sent back in the response to the front-end computer).

In the sixth scenario represented by the sixth tree graph 606, additional dimension candidates may be generated for the dimension starting from the relative root (selected) node of the hierarchy until the first level that contains leaf nodes. In this scenario, the maximum number of level candidates may not exceed the maximum depth of the tree minus the depth level of the relative root. The first level (ordered by depth) that contains a leaf node may be considered as the last valid candidate. The remaining candidates may be discarded.

In the seventh scenario represented by the seventh tree graph 607, candidates are generated for the levels of 2, 3, 4 and 5, as shown in FIG. 6. Level 6 in the tree (the lowest level) may discarded due to a leaf node on level 5. Candidates for the relative levels of 2, 3, and 4 may be discarded due to a relative leaf node count of 1. That is, candidates having a descendant cardinality value of 1 may be included in the set of dimension candidates sent to the front-end computer. This scenario may leave the level candidate of 5, enabling a meaningful navigation from the selected node to a level with more than one node.

In the eighth scenario represented by the eighth tree graph 608, dimension candidate generation stops once a leaf node is encountered. The dimension candidate generation may stop as the cardinality numbers would not add up on deeper levels. In some embodiments, the dimension candidate selection algorithm may be configured to handle scenarios when a leaf node is present on a higher level than what is represented by the candidate.

Example Methods

Figure 7:
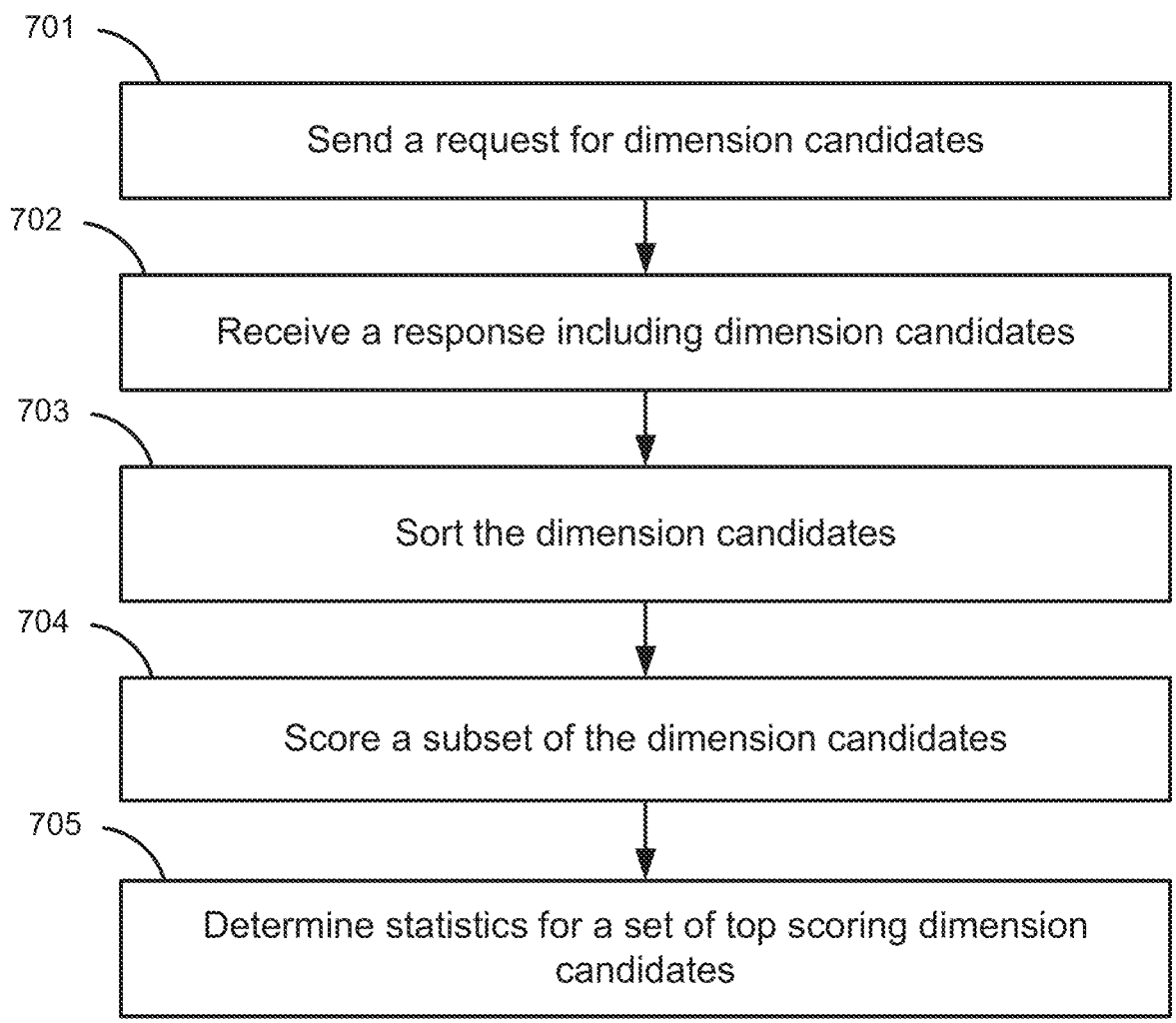
FIG. 7 shows a flow chart of a method for processing hierarchical data, according to an embodiment.

FIG. 7 shows a flow chart of a method for processing hierarchical data, according to an embodiment. The method may be performed by a front-end computer as described herein. At 701, the method includes sending a request for dimension candidates. The request may be sent to a back-end computer, as described herein. The request may include a selected dimension identifier and a selected node identifier. The selected dimension identifier identifies a first dimension of a plurality of qualitative dimensions of a numerical measure. The selected node identifier identifies a selected node within the first dimension.

At 702, the method includes receiving a response including a plurality of dimension candidates. The response may be received from the back-end computer. Each dimension candidate of the plurality of dimension candidates may include a candidate node identifier and a level indicator.

In some embodiments, the level indicator for each dimension candidate may include one or both of a drill down value and a level value. The drill down value may indicate a particular level down a subtree having the particular node as a root of the sub tree. The level value may indicate a particular level down a tree representing the corresponding dimension.

The candidate node identifier may indicate a particular node in a particular dimension of the plurality of dimensions. The level indicator indicates a set of nodes on a particular level of the particular dimension with respect to the particular node.

In some embodiments, each dimension candidate of the plurality of dimension candidates may further includes one or more of a dimension indicator indicating one of the plurality of dimensions, a cardinality value indicating a number of descendants, and a use indicator indicating whether the one of the plurality of dimensions is used in the chart.

In some embodiments, the method also includes sorting the plurality of dimension candidates based on one or more of the drill down value, the level value, the descendant cardinality values of the dimension candidate, and the use indicator. For example, receiving the response at 702, the method may include sorting the dimension candidates at 703.

In some embodiments, the method also includes determining a score for at least a subset of the plurality of dimension candidates. For example, after sorting the dimension candidates at 703, the method may include scoring the subset of the dimension candidates at 704. The score for a particular dimension candidate may be based on a deviation from an average of the numerical measure for each node in the set of nodes indicated by the particular dimension candidate. That is, the score may be determined using the equation (1) below, where the "max" is the maximum measure value (e.g., number of sales, income, etc.) corresponding to a node within the dimension candidate and "average" is the average measure value across all nodes within the dimension candidate:

$$(\max - \text{average})/\text{average} \quad (1)$$

If the average is negative, the score may be determined using the equation (2) below, where "min" is the minimum measure value corresponding to a node within the dimension candidate:

$$(\min - \text{average})/\text{average} \quad (2)$$

In some embodiments, the method also includes selecting certain dimension candidates of the scoring subset to be included in the subset of the plurality of dimension candidates based on score for the certain dimension candidate.

At 705, the method includes determining statistics (e.g., a statistics based on an average of a measure) for each dimension candidate in a first subset of the plurality of dimension candidates. The statistics for the dimension candidate may be based on an average of the numerical measure for the set of nodes indicated by candidate node identifier and the level indicator of the dimension candidate.

In some embodiments, the method also includes rendering a chart in a user interface. In some embodiments, the method also includes obtaining user input requesting statistics related to a selected node of the first dimension. In some embodiments, the method also includes determining the selected node of the first hierarchical dimension, the selected node based on the user input. In some embodiments, the method also includes rendering the statistics in the user interface along with a chart.

Figure 8:
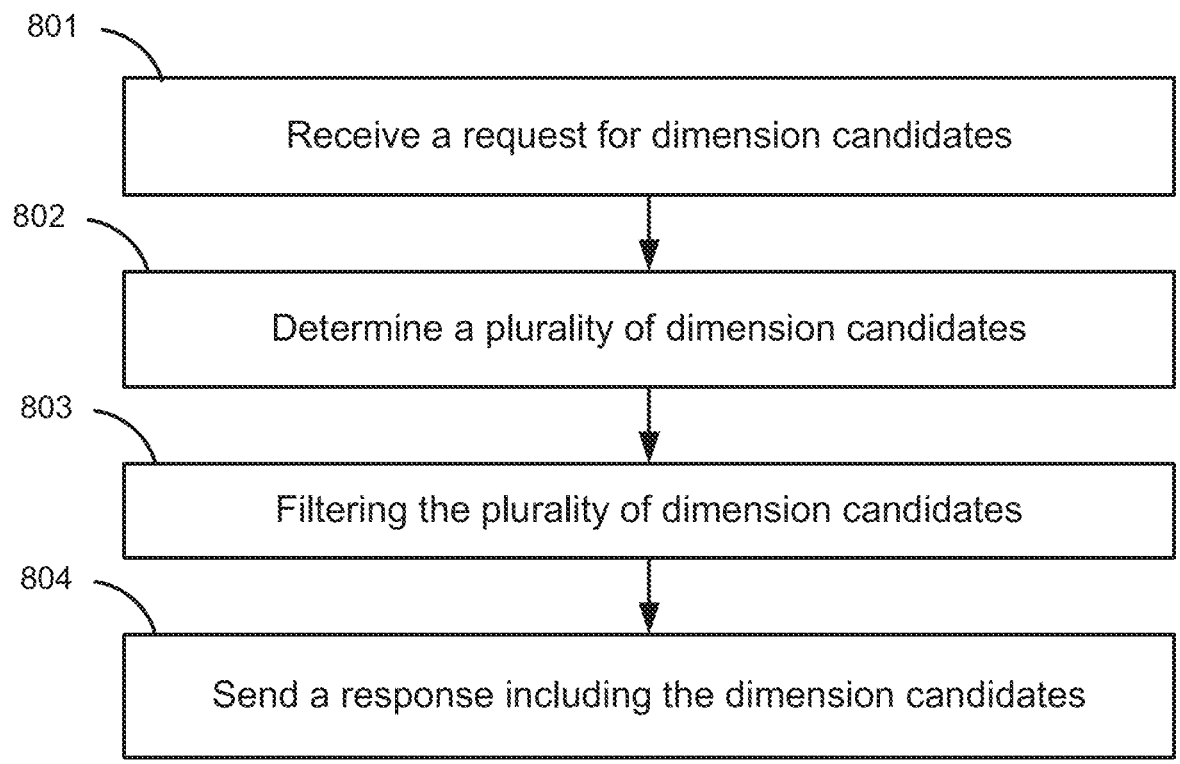
FIG. 8 shows a flow chart of a method for processing hierarchical data, according to an embodiment.

FIG. 8 shows a flow chart of a method for processing hierarchical data, according to an embodiment. The method may be performed by a back-end computer, as discussed herein. At 801, the method includes receiving a request for dimension candidates. The request may be received from a front-end computer, as described herein. The request may include a selected dimension identifier and a selected node identifier. The selected dimension identifier may identify a first dimension of a plurality of qualitative dimensions of a numerical measure. The selected node identifier may identify a selected node within the first dimension.

At 802, the method includes determining a plurality of dimension candidates. The plurality of dimension candidates may be determined based on the selected dimension identifier and the selected node identifier. In some embodiments, the method also includes determining the plurality of dimension candidates based on descendant cardinality values for each node in the plurality of qualitative dimensions. In some embodiments, the method further includes filtering the plurality of dimension candidates. The filtering of the dimension candidates may be based on a minimum cardinality value and a maximum cardinality values to obtain a filtered subset of the plurality of dimension candidates. In such embodiments, the plurality of dimension candidates in the response may be the filtered subset of the plurality of dimension candidates. For example, after the plurality of dimension candidates are determined at 802, the plurality of dimension candidates may be filtered at 803.

In some embodiments, the method also includes receiving updates to a dataset for the data model and determining the descendant cardinality values for each node of the plurality of qualitative dimensions based on the updates to the dataset.

At 804, the method includes sending a response including the plurality of dimension candidates. The response may be sent to the front-end computer. Each dimension candidate of the plurality of dimension candidates may include a candidate node identifier and a level indicator. The candidate node identifier may indicate a particular node in a particular dimension of the plurality of dimensions. The level indicator may indicate a set of nodes on a particular level of the particular dimension with respect to the particular node.

In some embodiments, the level indicator for each dimension candidate may include one or both of a drill down value and a level value. The drill down value may indicate a particular level down a subtree having the particular node as a root of the sub tree. The level value may indicate a particular level down a tree representing the corresponding dimension.

In some embodiments, each dimension candidate of the plurality of dimension candidates further includes one or more of a dimension indicator that may indicate one of the plurality of dimensions, a cardinality value that may indicate a number of descendants, and a use indicator that may indicate whether the one of the plurality of dimensions is used in the chart.

Figure 9:
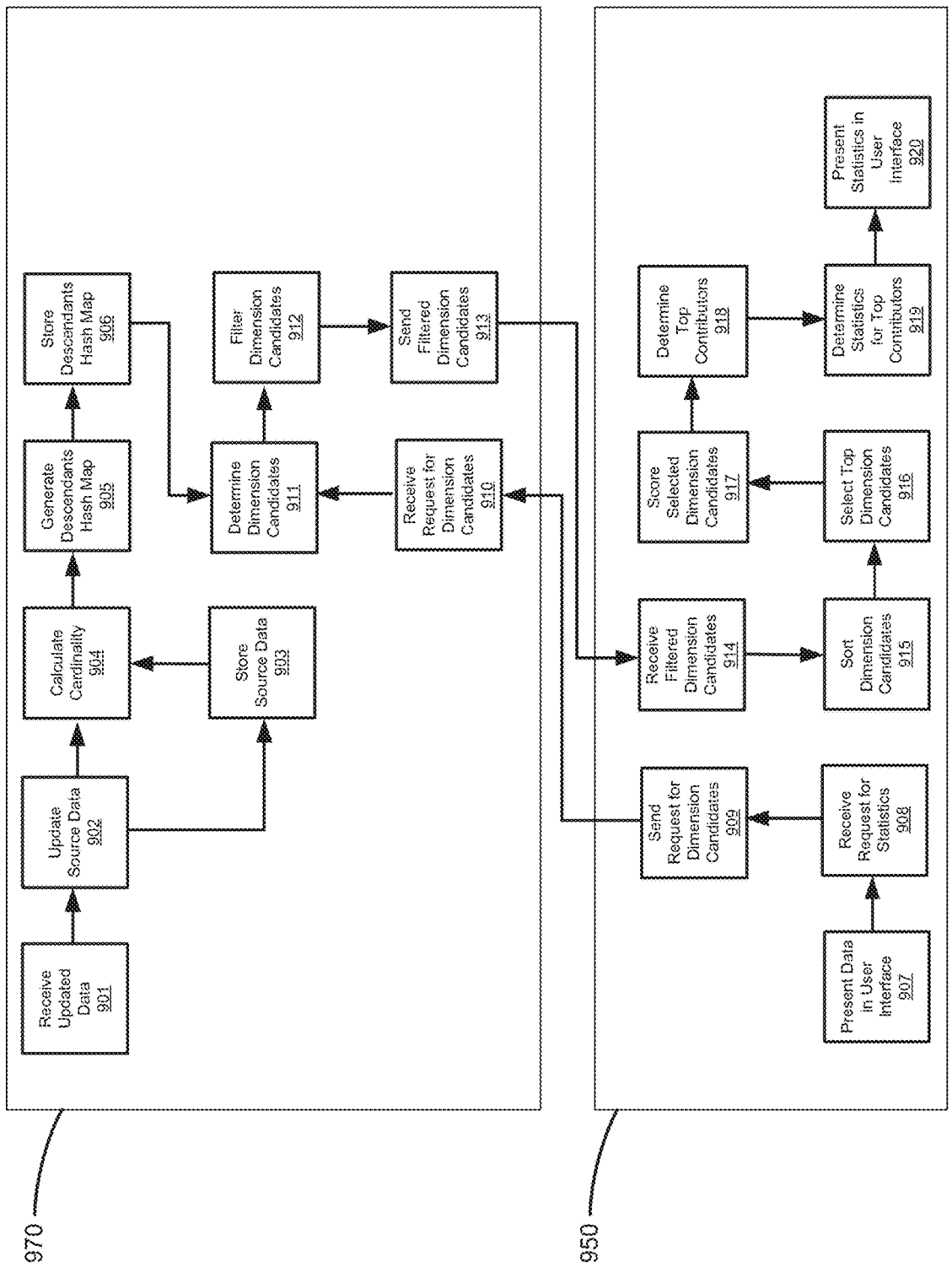
FIG. 9 shows a diagram of a method for processing dimension candidates, according to an embodiment.

FIG. 9 shows a diagram of a method for processing dimension candidates, according to an embodiment. Functional blocks contained within the upper block 970 may be performed by a back-end computer as described herein. Functional blocks contained within the lower block 950 may be performed by a front-end computer as described here.

At 901 the back-end computer may receive updated data. The updated data may include updates to source data used for a data model. At 902 the back-end computer may use the updated data to update source data stored at the back-end computer. At 903 the back-end computer may store the updated source data.

In response to receiving updated data, the back-end computer can re-calculate the cardinality information at 904. The back-end computer may also re-calculate the other dimension candidate information (e.g., the dimension, whether the dimension is used in the chart, the absolute level, and the drill level). This information can be determined using the tree traversal process discussed above. The back-end computer can generate a descendant hash map at 905 and store the information determined by the tree traversal process in the hash map. As described above, the hash map may use the parent node identifier as the key and the corresponding value may be an object containing an array of child node identifiers and the level identifier of the selected or root node.

At 907, the front-end computer may present data in a user interface. For example, the data may be charts or graphs representing a data model as discussed above. At 908 the front-end computer receives a request for statistics. The request may be received via the user interface (e.g., the user clicking a button), as discussed above. At 909 the front-end computer may send a request for dimension candidates. The request may be sent to the back-end computer. For example, the request may include a node identifier, a dimension identifier, and context information (e.g., information describing the dimensions used by the user).

At 910, the back-end computer may receive the request for dimension candidates. At 911 the back-end computer determines the dimension candidates, as discussed above. For example, the back-end computer may access the descendants hash map to determine, based on cardinality information, a set of dimension candidates to send to the front-end computer. At 912 the back-end computer may filter the dimension candidates. For example, dimension candidates having a cardinality of 1 may be filtered out because such results would not be interesting (e.g., because there is only one child of the parent), as discussed above. The back-end computer may also filter out dimension candidates for having too many descendants (e.g., based on a threshold), as discussed above. At 913, the back-end computer may send the filtered dimension candidates to the front-end computer (e.g., over a network).

At 914, the front-end computer receives the set of filtered dimension candidates. At 915 the front-end computer may sort the dimension candidates. For example, the front-end computer may sort the dimension candidates such that dimension candidates that not in the chart are above dimensions that are in the chart, dimension candidates having a lesser "level" are sorted higher, dimension candidates having a lesser "drill" are sorted higher, and dimension candidates having lower cardinality are sorted higher. In some embodiments, a flat dimension may be considered to have a lesser level and drill compared to hierarchical dimension candidates. At 916, the front-end computer may select the top dimension candidates from among the sorted dimension candidates. The number selected may be pre-determined or it may be a percentage. At 917, the front-end computer scores the selected dimension candidates (e.g., by determining deviance scores), as discussed herein. At 918, the front-end computer ranks the scored dimension candidates to determine the top contributors. The dimension candidates may be ranked according to their scores, where higher scores have a higher rank. The front-end computer may determine one or more top candidates based on a pre-determined a number or percentage. At 919, the front-end may determine statistics for the top contributors. For example, the statistics may indicate how much the top contributor deviates from the average. At 920, the front-end computer may present the statistics in the user interface, as discussed above. As such, the user may be provided with insights based on the statistics and may be able to use those insights for decision making, as discussed above.

Thus, the analytics system described herein provides features and advantages over prior analytics systems. For instance, the improved analytics software described herein reduces complexity of the analysis and make it easier for users of data analytics software to gather insights from the analysis by limiting the statistics shown in the user interface to statistics on the top contributors. As such, it is less likely that the user will be overwhelmed by the analysis. In addition, presenting statistical analysis on the most interesting parts of the data is advantageous because it enables the user to be better able to apply insights gathered from the analytics software to decision making.

Example Hardware

Figure 10:
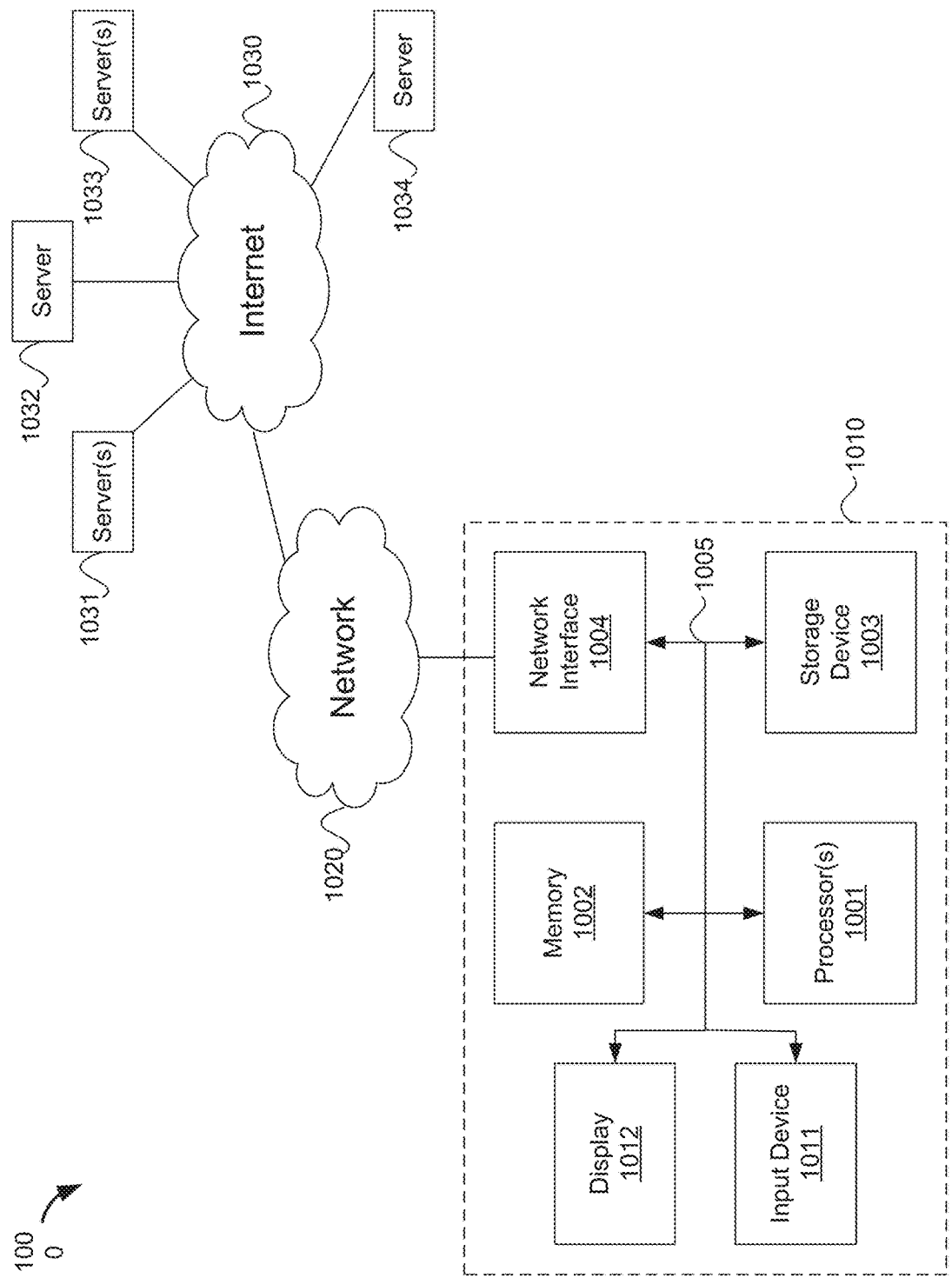
FIG. 10 shows a diagram of hardware of a special purpose computing machine for implementing systems and methods described herein.

FIG. 10 shows a diagram of hardware of a special purpose computing machine for implementing systems and methods described herein.

The following hardware description is merely one example. It is to be understood that a variety of computers topologies may be used to implement the above described techniques. An example computer system 1010 is illustrated in FIG. 10. Computer system 1010 includes a bus 1005 or other communication mechanism for communicating information, and one or more processor(s) 1001 coupled with bus 1005 for processing information. Computer system 1010 also includes a memory 1002 coupled to bus 1005 for storing information and instructions to be executed by processor 1001, including information and instructions for performing some of the techniques described above, for example. This memory may also be used for storing programs executed by processor(s) 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1003 may include source code, binary code, or software files for performing the techniques above, for example. Storage device and memory are both examples of non-transitory computer readable storage mediums.

Computer system 1010 may be coupled via bus 1005 to a display 1012 for displaying information to a computer user. An input device 1011 such as a keyboard, touchscreen, and/or mouse is coupled to bus 1005 for communicating information and command selections from the user to processor 1001. The combination of these components allows the user to communicate with the system. In some systems, bus 1005 represents multiple specialized buses, for example.

Computer system also includes a network interface 1004 coupled with bus 1005. Network interface 1004 may provide two-way data communication between computer system 1010 and a network 1020. The network interface 1004 may be a wireless or wired connection, for example. Computer system 1010 can send and receive information through the network interface 1004 across a local area network, an Intranet, a cellular network, or the Internet, for example. In the Internet example, a browser, for example, may access data and features on backend systems that may reside on multiple different hardware servers 1031-1034 across the network. The servers 1031-1034 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
sending, by a front-end computer to a back-end computer, a request for dimension candidates for a data model, the request including a selected dimension identifier and a selected node identifier, the selected dimension identifier identifying a first dimension of a plurality of qualitative dimensions of the data model, the selected node identifier identifying a selected node within the first dimension;
receiving, by the front-end computer from the back-end computer, a response including a plurality of dimension candidates, each dimension candidate of the plurality of dimension candidates including a candidate node identifier and a level indicator, the candidate node identifier indicating a particular node in a particular dimension of the plurality of dimensions, the level indicator indicating a set of nodes on a particular level of the particular dimension with respect to the particular node;
determining, by the front-end computer, a cardinality value for each of the dimension candidates in the plurality of dimension candidates;
sorting, by the front-end computer, the plurality of dimension candidates based on the cardinality values, wherein dimension candidates having a lower cardinality value are sorted higher;
selecting a subset of the dimension candidates of the plurality of dimension candidates based on the sorted cardinality values to obtain a first subset of the plurality of dimension candidates;
determining, by the front-end computer, a score for at least the first subset of the plurality of dimension candidates, the score for a particular dimension candidate based on a deviation from an average of numerical measures across each node in the set of nodes indicated by the particular dimension candidate;
selecting, by the front-end computer, certain dimension candidates of the first subset to be included in a second subset of the plurality of dimension candidates based on the score for the certain dimension candidates;
determining, by the front-end computer, statistics for the second subset of the plurality of dimension candidates, wherein the statistics are comprised of cardinality information and one or more other parameters of the dimension candidates;
generating, by the front-end computer, a statistical analysis on datasets containing hierarchical data for the second subset of the plurality of dimension candidates;
presenting, by the front-end computer, insights of the statistical analysis to a user;
automatically regenerating, by front-end computer, a new statistical analysis triggered in response to any change in source data or source metadata; and
automatically presenting, by the front-end computer, insights of the new statistical analysis to the user.

2. The computer-implemented method of claim 1, further comprising:
sorting, by the front-end computer, the plurality of dimension candidates based on one or more of a drill down value, a level value, and a use indicator.

3. The computer-implemented method of claim 1, further comprising:
rendering, by the front-end computer, a chart in a user interface, the chart based on the numerical measure of the data model;
obtaining, by the front-end computer, user input requesting statistics related to a selected node of the first dimension; and
determining, by the front-end computer, the selected node of the first dimension, the selected node based on the user input.

4. The computer-implemented method of claim 1, wherein the level indicator for each dimension candidate includes one or both of a drill down value and a level value, the drill down value indicating a particular level down a subtree having the particular node as a root of the sub tree, the level value indicating a particular level down a tree representing a corresponding dimension.

5. The computer-implemented method of claim 1, wherein each dimension candidate of the plurality of dimension candidates further includes one or more of a dimension indicator indicating one of the plurality of dimensions, a cardinality value indicating a number of descendants, and a use-indicator indicating whether the one of the plurality of dimensions is used in an output chart.

6. The computer-implemented method of claim 1, further comprising:
rendering, by the front-end computer, the statistics in a user interface along with a chart.

7. The computer-implemented method of claim 1, wherein a number of dimension candidates included in the first subset is pre-determined.

8. The computer-implemented method of claim 1, wherein a number of dimension candidates included in the first subset is a percentage of top dimension candidates.

9. The computer-implemented method of claim 1, wherein the second subset is a subset of the first subset.

10. A computer-implemented method, comprising:
receiving, by a back-end computer from a front-end computer, a request for dimension candidates for a data model, the request including a selected dimension identifier and a selected node identifier, the selected dimension identifier identifying a first dimension of a plurality of qualitative dimensions of the data model, the selected node identifier identifying a selected node within the first dimension;

determining, by the back-end computer, a plurality of dimension candidates based on the selected dimension identifier and the selected node identifier;

sending, by the back-end computer to the front-end computer, a response including the plurality of dimension candidates, each dimension candidate of the plurality of dimension candidates including a candidate node identifier and a level indicator, the candidate node identifier indicating a particular node in a particular dimension of the plurality of dimensions, the level indicator indicating a set of nodes on a particular level of the particular dimension with respect to the particular node;

determining, by the front-end computer, a cardinality value for each of the dimension candidates in the plurality of dimension candidates;

sorting, by the front-end computer, the plurality of dimension candidates based on the cardinality values, wherein dimension candidates having a lower cardinality are sorted higher;

selecting a subset of the dimension candidates of the plurality of the dimension candidates based on the sorted cardinality values to obtain a first subset of the plurality of dimension candidates;

determining, by the front-end computer, a score for at least the first subset of the plurality of dimension candidates, the score for a particular dimension candidate based on a deviation from an average of numerical measures across each node in the set of nodes indicated by the particular dimension candidate;

selecting, by the front-end computer, certain dimension candidates of the first subset to be included in a second subset of the plurality of dimension candidates based on the score for the certain dimension candidates;

determining, by the front-end computer, statistics for the second subset of the plurality of dimension candidates, wherein the statistics are comprised of cardinality information and one or more other parameters of the dimension candidates;

generating, by the back-end computer, a statistical analysis on datasets containing hierarchical data for the second subset of the plurality of dimension candidates;

presenting, by the front-end computer, insights of the statistical analysis to a user;

automatically regenerating, by back-end computer, a new statistical analysis triggered in response to any change in source data or source metadata; and automatically presenting, by the front-end computer, insights of the new statistical analysis to the user.

11. The computer-implemented method of claim 10, further comprising:

receiving, by the back-end computer, updates to a dataset for the data model; and determining, by the back-end computer, descendant cardinality values for each node of the plurality of qualitative dimensions based on the updates to the dataset.

12. The computer-implemented method of claim 10, further comprising:

filtering, by the back-end computer, the plurality of dimension candidates based on a minimum cardinality value and a maximum cardinality value to obtain a filtered subset of the plurality of dimension candidates, wherein the plurality of dimension candidates in the response are the filtered subset of the plurality of dimension candidates.

13. The computer-implemented method of claim 10, wherein the level indicator for each dimension candidate includes one or both of a drill down value and a level value, the drill down value indicating a particular level down a subtree having the particular node as a root of the subtree, the level value indicating a particular level down a tree representing a corresponding dimension.

14. The computer-implemented method of claim 10, wherein each dimension candidate of the plurality of dimension candidates further includes one or more of a dimension indicator indicating one of the plurality of dimensions, a cardinality value indicating a number of descendants, and a use indicator indicating whether the one of the plurality of dimensions is used in an output chart.

15. A non-transitory machine-readable medium storing a program executable by at least one processing unit of a device, the program comprising sets of instructions for:

sending, to a back-end computer, a request for dimension candidates for a data model, the request including a selected dimension identifier and a selected node identifier, the selected dimension identifier identifying a first dimension of a plurality of qualitative dimensions of the data model, the selected node identifier identifying a selected node within the first dimension;

receiving, from the back-end computer, a response including a plurality of dimension candidates, each dimension candidate of the plurality of dimension candidates including a candidate node identifier and a level indicator, the candidate node identifier indicating a particular node in a particular dimension of the plurality of dimensions, the level indicator indicating a set of nodes on a particular level of the particular dimension with respect to the particular node;

determining, statistics for each dimension candidate in a first subset of the plurality of dimension candidates, the statistics for each dimension candidate based on a numerical measure in the data model for each node in the set of nodes indicated by candidate node identifier and the level indicator of the dimension candidate, cardinality information, and other parameters of the dimension candidate;

sorting the plurality of dimension candidates based on cardinality values, wherein the dimension candidates having a lower cardinality are sorted higher;

selecting a subset of the dimension candidates of the plurality of dimension candidates based on the sorted cardinality values to obtain a first subset of the plurality of dimension candidates;

determining a score for at least the first subset of the plurality of dimension candidates, the score for a particular dimension candidate based on a deviation from an average of numerical measures across each node in the set of nodes indicated by the particular dimension candidate;

selecting certain dimension candidates of the first subset to be included in a second subset of the plurality of dimension candidates based on the score for the certain dimension candidate;

determining statistics for the second subset of the plurality of dimension candidates, wherein the statistics are comprised of cardinality information and one or more other parameters of the dimension candidates;

generating, a statistical analysis on datasets containing hierarchical data for the second subset of the plurality of dimension candidates;

presenting, insights of the statistical analysis to a user;

automatically regenerating, a new statistical analysis triggered in response to any change in source data or source metadata; and automatically presenting, insights of the new statistical analysis to the user.

16. The non-transitory machine-readable medium of claim 15, wherein the program further comprises sets of instructions for:
sorting the plurality of dimension candidates based on one or more of a drill down value, a level value, and a use indicator.

17. The non-transitory machine-readable medium of claim 15, wherein the program further comprises sets of instructions for:
rendering a chart in a user interface, the chart based on the numerical measure of the data model;
obtaining user input requesting statistics related to a selected node of the first dimension; and
determining the selected node of the first dimension, the selected node based on the user input.

18. The non-transitory machine-readable medium of claim 15, wherein the level indicator for each dimension candidate includes one or both of a drill down value and a level value, the drill down value indicating a particular level down a subtree having the particular node as a root of the subtree, the level value indicating a particular level down a tree representing a corresponding dimension.

19. The non-transitory machine-readable medium of claim 15, wherein each dimension candidate of the plurality of dimension candidates further includes one or more of a dimension indicator indicating one of the plurality of dimensions, a cardinality value indicating a number of descendants, and a use-indicator indicating whether the one of the plurality of dimensions is used in an output chart.

20. The non-transitory machine-readable medium of claim 15, wherein the program further comprises sets of instructions for:
rendering the statistics in a user interface along with a chart.

* * * * *